US008249876B1

(12) United States Patent
Ainslie (10) Patent No.: US 8,249,876 B1
(45) Date of Patent: Aug. 21, 2012

(54) METHOD FOR PROVIDING ALTERNATIVE INTERPRETATIONS OF A VOICE INPUT TO A USER

(75) Inventor: Alex Neely Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/342,910

(22) Filed: Jan. 3, 2012

(51) Int. Cl.
*G10L 21/00* (2006.01)

(52) U.S. Cl. ............... 704/270; 704/235; 704/270.1; 704/275; 707/769

(58) Field of Classification Search .......... 704/270, 704/235, 270.1, 275; 707/769
See application file for complete search history.

(56) References Cited

U.S. PATENT DOCUMENTS

| 6,564,213 B1 * | 5/2003 | Ortega et al. ..................... 1/1 |
| 7,366,668 B1 | 4/2008 | Franz et al. |
| 7,461,059 B2 * | 12/2008 | Richardson et al. .............. 1/1 |
| 2006/0259479 A1 * | 11/2006 | Dai .................................. 707/4 |
| 2007/0033037 A1 * | 2/2007 | Mowatt et al. ............... 704/251 |
| 2009/0287626 A1 | 11/2009 | Paek et al. |
| 2009/0287680 A1 * | 11/2009 | Paek et al. ........................ 707/5 |
| 2011/0161347 A1 * | 6/2011 | Johnston ....................... 707/769 |

* cited by examiner

*Primary Examiner* — Vincent P Harper
(74) *Attorney, Agent, or Firm* — McDermott Will & Emery LLP (57) ABSTRACT

A system and computer-implemented method for providing alternative voice interpretations to a user, including receiving an indication of a request for a search from a user comprising a voice input of search criteria, determining an n-best list of a plurality of possible interpretations of the voice input in response to receiving the indication, each possible interpretation comprising a word or phrase corresponding to the voice input, providing a first possible interpretation of the plurality of possible interpretations for display to the user, the first possible interpretation being the most likely interpretation of the voice input, receiving an indication that the first possible interpretation does not correspond to the voice input search criteria and providing one or more alternative interpretations of the plurality of interpretations for display to the user within a suggestion display area in response to receiving the indication.

17 Claims, 4 Drawing Sheets

METHOD FOR PROVIDING ALTERNATIVE INTERPRETATIONS OF A VOICE INPUT TO A USER

BACKGROUND

The subject disclosure generally relates to voice search services, and, in particular, to improving the performance and usability of voice search.

Voice search, also called voice-enabled search, allows the user to use a voice command to search the Internet, or a portable device. When a user is performing a voice search, the user inputs a voice query and the system interprets the voice input by the user and provides the user with search suggestions according to the interpretation. However, for various reasons, including the accent of a user, the system may incorrectly interpret the voice input of the user. If the user's utterance is incorrectly understood by the system, the user's natural response is to just click the cursor within the search box and begin typing in the intended search criteria using text based search. It may be possible for the user to reenter their voice query, but this may require extra steps and users usually may be discouraged after trying the voice input option once and not receiving desired results.

Thus, it may be desirable to provide a user with alternative voice interpretation results upon detecting that the user has not received satisfactory results based on their voice input.

SUMMARY

The disclosed subject matter relates to a computer-implemented method for providing alternative voice interpretations to a user, the method comprising receiving an indication of a request for a search from a user comprising a voice input of search criteria. The method further comprising determining an n-best list of a plurality of possible interpretations of the voice input in response to receiving the indication, each possible interpretation comprising a word or phrase corresponding to the voice input. The method further comprising providing a first possible interpretation of the plurality of possible interpretations for display to the user, wherein the first possible interpretation is the most likely interpretation of the. The method further comprising receiving an indication that the first possible interpretation does not correspond to the voice input search criteria and providing one or more alternative interpretations of the plurality of interpretations for display to the user within a suggestion display area in response to receiving the indication that the first possible interpretation does not correspond to the search criteria.

The disclosed subject matter also relates to a system for providing alternative voice interpretations to a user, the system comprising one or more processors and a machine-readable medium comprising instructions stored therein, which when executed by the processors, cause the processors to perform operations comprising receiving a voice input from a user corresponding to search criteria. The operations comprising determining a plurality of possible interpretations of the voice input in response to receiving the indication, each possible interpretation comprising one or more words or phrases. The operations further comprising providing a first possible interpretation of the plurality of possible interpretations for display to the user, wherein the first possible interpretation is the most likely interpretation of the voice input. The operations further comprising receiving an indication that the first possible interpretation does not correspond to the voice input based on user activity and providing one or more alternative interpretations of the plurality of interpretations for display to the user within a suggestion display area in response to receiving the indication that the first possible interpretation does not correspond to the voice input.

The disclosed subject matter also relates to a machine-readable medium comprising instructions stored therein, which when executed by a machine, cause the machine to perform operations comprising receiving an indication of a request for a search from a user comprising a voice input. The operations further comprising identifying a plurality of possible interpretations of the voice input in response to receiving the indication, each possible interpretation comprising a word or phrase corresponding to the voice input, wherein each possible interpretation is associated with a likelihood of corresponding to the voice input. The operations further comprising selecting a first possible interpretation of the plurality of possible interpretations based on the likelihood associated with each of the plurality of possible interpretations, the first possible interpretation having the highest likelihood of the plurality of possible interpretations. The operations further comprising providing the first possible interpretation for display to the user within a search box display area configured to receive text entries of search criteria from a user. The operations further comprising receiving an indication of the user clicking within the search box display area and providing one or more alternative interpretations of the plurality of interpretations for display to the user within a suggestion display area in response to receiving the indication of the user clicking within the search box display area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Search by voice technology provides users with the ability to search by voice on a variety of electronic/digital devices, such as a mobile phone or PC. Voice search enabled devices and/or systems facilitate search for data upon the user entering information on what to search by speaking. When a user is performing a voice search, the system interprets the voice input by the user and provides the user with search suggestions according to the interpretation (e.g., best hypothesis of what the user meant to say). If the utterance by the user is incorrectly understood by the system, the natural response of the user may be to just click the cursor within the search box and begin typing in the intended word or phrase and perform a text based search. The system may also allow the user to select a special button to receive other possible interpretations of the voice input uttered by the user if the interpretation is erroneous. However, after receiving an erroneous result, the user may be discouraged and unlikely to take the extra step to see if other interpretations are available and is more likely to attempt a text based search.

The subject disclosure provides a method and system for providing alternative interpretations to a user performing a voice search in a way that is consistent with the user's natural response. In response to receiving a voice input consisting of search criteria, the system interprets the voice input and presents the interpretation (e.g., phrase or word) with the highest confidence (e.g., the most likely interpretation) to the user within the search box. Based on the interpreted search criteria, the system may also provide search phrase suggestions (e.g., auto-complete suggestions) within a suggestion box and/or search results based on the interpreted term or phrase for display to the user.

Upon displayed the most likely interpretation to the user, the system may receive an indication that the provided interpretation does not correspond to the search criteria intended by the user. For example, the system determines that the user has clicked within the search box (e.g., as to modify or remove the word or phrase). In response, the system identifies an "n-best list" including one or more alternative interpretations of the voice input (e.g., a specific number of the best statistical guesses as words or phrases that the user may have uttered) and displays a selected number of alternative interpretations from the n-best list to the user within a "suggestion display area" (e.g., within the area usually displaying the search phrase suggestions for search items).

In addition to displaying the n-best list, the system may also display search phrase suggestions within the suggestion display area along with the n-best list. The search phrase suggestions may for example include, "Search for . . . " (a search phrase causing a search for the word(s) or phrase(s) interpreted from the user voice input), "URL" (a URL matching the word(s) or phrase(s)), "Previous URLs" (a previous URL matching the word(s) or phrase(s)), "Nav Suggest" (A URL for searching the word(s) or phrase(s) using a default search provider), "Search Suggest" (suggested search terms corresponding to the word(s) or phrase(s) searched using the user's default search provider) and "History Results" (a number of entries in the user's history that match the word(s) or phrase(s)—selecting this item may take the user to the history results page for the word(s) or phrase(s)).

The search phrase suggestions may be related to the next best word or phrase within the list of alternative interpretations (the word(s) or phrase(s) with the second highest confidence) since the refocusing suggests that the word or phrase with the highest confidence is not accurate. Alternatively, search phrase suggestions may be presented for multiple alternative interpretations (e.g., words or phrases) within the n-best list. In such instances, the number of suggestions for each alternative interpretation within the n-best list may be based on the confidence score for each of the alternative interpretations (e.g., such that the highest alternative interpretation includes the highest number of suggestions and the number of suggestions for each alternative interpretation decreases down the list).

In this manner the alternative interpretations are presented to the user as part of the natural flow of actions likely to be taken by the user (i.e., clicking within the search box to correct the erroneous interpretation). Furthermore, by mixing in search phrase suggestions, an extra step of selecting the correct interpretation and then receiving search phrase suggestions may be avoided, thus creating a better experience for the user. Once the user has selected the intended search criteria from the alternative interpretations and search phrase suggestions, the search is conducted according to the selected search criteria.

Figure 1:
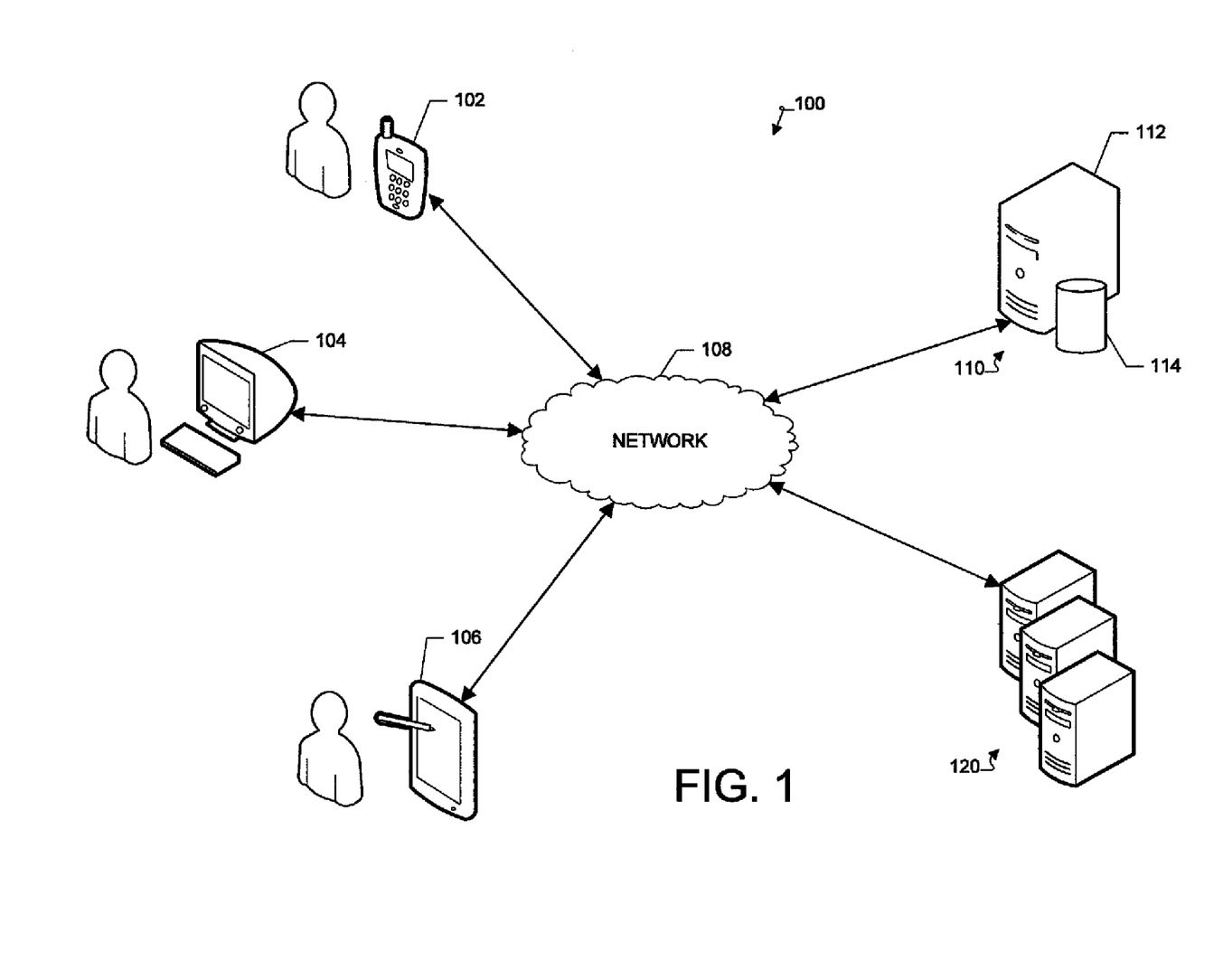
FIG. 1 illustrates an example client-server network environment, which provides for providing alternative interpretations of a voice input to a user.

FIG. 1 illustrates an example client-server network environment, which provides for providing alternative interpretations of a voice input to a user. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example embodiments, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In one embodiment, server 110 includes a processing device 112 and a data store 114. Processing device 112 executes computer instructions stored in data store 114, for example, to facilitate providing alternative interpretations of a voice input to a user. Server 110 may further be in communication with remote servers 120 either through the network 108 or through another network or communication means.

According to some aspects, remote servers 120 can be any system or device having a processor, a memory and communications capability for hosting various search engines and/or voice interpretation services. In one embodiment, remote servers 120 may be further capable of maintaining one or more remote databases. The voice search services hosted on the remote server 120 may enable users to provide voice input search criteria and receive search results according to the voice input. The remote servers 120 may further facilitate searching for content across multiple resources and databases using the search engine.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. While server 110 and the one or more remote servers 120 are displayed as being remote from one another, it should be understood by one skilled in the art that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more social networking services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user interacting with a client device (e.g., electronic devices 102, 104, 106), may input a voice command including search criteria to perform a search for an item. For example, a user may select a special voice search button and may be prompted to input search criteria by speaking through a microphone or other voice input device at the user's client device (e.g., electronic devices 102, 104 and 106). A data set including the voice input may be forwarded to the system and/or voice search service for interpretation and processing. Upon receiving the voice input, the system (e.g., through the voice search service) identifies a listing of interpretations associated with the voice input (e.g., an n-best list of possible interpretations). The system selects the best interpretation and provides the interpretation for display to the user within a search box at the user's client device. The system may further identify one or more search phrase suggestions. Search phrase suggestions consist of possible search queries corresponding to voice input search criteria received from the user. The search phrase suggestions may be provided for display to the user within a suggestion display area at the graphical user interface displayed at the client device of the user. If the interpretation is satisfactory, the user may receive search results according to the interpretation (e.g., based on the interpreted word(s) or phrase(s) or by selecting any of the search phrases presented to the user within the search suggestion box).

Alternatively, if the system receives an indication of the user clicking within the search box (e.g., within a pre-determined period of time after the user enters a voice input), the system assumes that the presented interpretation is not satisfactory and may select one or more alternative interpretations from an n-best list of search interpretations and present the alternative interpretations for example within the suggestion box which displayed the search phrase suggestions. In addition, the system may further provide one or more search phrase suggestions for each of the alternative interpretations being provided to the user. Upon receiving the alternative interpretations and/or the suggested search phrases associated with the alternative interpretations, the user may select any of the suggestions (e.g., either an alternative interpretation or a search phrase suggestion). A search is performed (e.g., at the search engine or by the system) based on the selection of the user and search results corresponding to the selection are presented to the user.

Figure 2:
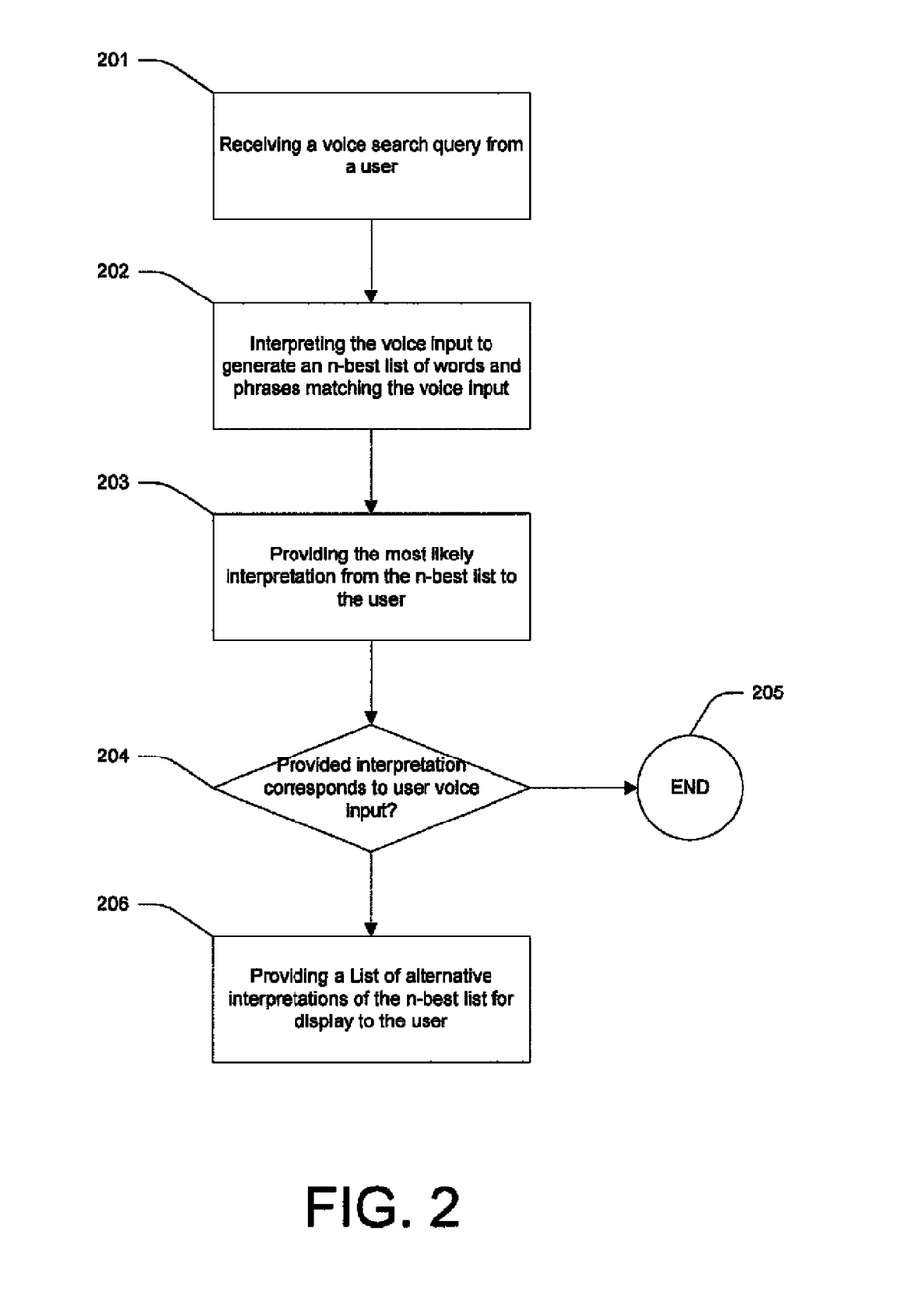
FIG. 2 illustrates a flow diagram of an example process for providing search suggestions to a user performing a voice search.

FIG. 2 illustrates a flow diagram of an example process 200 for providing search suggestions to a user performing a voice search. In step 201, the system receives an indication of search request form a user including a voice string corresponding to search criteria. For example, a user may select a special voice search button and may be prompted to input search criteria by speaking through a microphone or other voice input device at the user's client device (e.g., electronic devices 102, 104 and 106).

In step 202, the system determines a listing of n-best list of interpretations (i.e., word(s) or phrase(s)) matching the voice input. For example, the voice input is analyzed (e.g., by the system or voice search service) and based on the result of the analyzing, a listing of the closest interpretations of the voice input is generated. Various methods and processes may be employed for interpreting the voice input and generating the n-best list of interpretations. The processes and systems described with respect to the present disclosure may be implemented in association with any system or process for interpreting the voice input and generating an n-best list of possible interpretations. The n-best list provides a list of likely possibilities returned by a voice recognizer (e.g., the voice search service). The n-best list of words or phrases may include various interpretations of the voice input and may further include a score or ranking of the interpretations such that the system is able to generate a sorted list of the n-best interpretations associated with the voice input received from the user. The ranking or score corresponds to the confidence or likelihood that the interpretation corresponds to the voice input. In one example, in step 202 only a first interpretation (e.g., the most likely interpretation) may be identified, and the n-best list may not be generated until later in the process (e.g., in step 206).

In step 203, the system provides the most likely interpretation (i.e., the most likely word or phrase corresponding to the user voice input) to the user in response to the search request and/or voice input by the user. In one example, the most likely interpretation is provided in text format for display within a "search box" displayed on the graphical user interface at the user client device. The search box may be a box used to enter text search criteria corresponding to a search request. In addition, the system may also provide a list of one or more suggested search phrases associated with the provided interpretation to the user. The search phrases may be displayed within a suggestion display area within the graphical user interface at the user's client device.

The search phrase suggestions may for example include, "Search for . . . " (a search phrase causing a search for the word(s) or phrase(s) interpreted from the user voice input), "URL" (a URL matching the word(s) or phrase(s)), "Previous URLs" (a previous URL matching the word(s) or phrase(s)), "Nav Suggest" (a URL for searching the word(s) or phrase(s) using a default search provider), "Search Suggest" (suggested search terms corresponding to the word(s) or phrase(s)

searched using the user's default search provider) and "History Results" (one or more words or URLs in the user's history that match the word(s) or phrase(s)—selecting this item may take the user to the history results page for the word(s) or phrase(s)).

In step 204, the system determines whether the provided interpretation (e.g., the most likely interpretation) corresponds to the voice input provided by the user. For example, where the user clicks within the search box (e.g., within a predetermined window of time after the interpretation is provided for display to the user) such action may indicate that the user is seeking to edit the interpretation or enter a new text search criteria. In such instance, the system infers that the interpretation provided to the user in step 203 is not the correct interpretation of the user's voice input. Other user reactions such as user inactivity or clicking the voice search button again, may also trigger a similar determination of user dissatisfaction with the provided interpretation. Inversely, signals that may provide evidence that the user is satisfied with the provided interpretation, i.e., that the interpretation correctly corresponds to the user's voice input, may include a user selection of one of the search phrase suggestions displayed to the user or other selection indicating that the user wishes to view search results corresponding to the provided interpretation.

If, in step 204, the system determines that the provided interpretation corresponds to the user voice input, the process ends in step 205. Following the end of process 200 in step 205, the user may be provided with search results based on the provided interpretation or one of the one or more search phrases presented to the user in association with the provided interpretation. Otherwise, when it is determined that the provided interpretation does not correspond to the voice input, for example when the user has indicated dissatisfaction with the provided interpretation, the process continues to the step 206.

In step 206, the system provides one or more alternative interpretations (e.g., from the n-best list of interpretations determined in step 202) for display to the user. The alternative interpretations may include a listing of the next n interpretations most likely to correspond to the user's voice input (e.g., based on ranking or scores provided in association with each entry within the list of interpretations determined in step 202). The listing of alternative interpretations may be displayed within the suggestion display area usually displaying search phrase suggestions. The system generates the listing of one or more alternative interpretations (e.g., a specific number of the best statistical guesses as words or phrases that the user may have uttered) and displays the list to the user within a "suggestion display area" (e.g., within the area usually displaying the search phrase suggestions for search items).

In addition to displaying the alternative interpretations list, the system may also display search phrase suggestions within the suggestion display area along with the list. The search phrase suggestions may for example include, "Search for . . . " (a search phrase causing a search for the word(s) or phrase(s) interpreted from the user voice input), "URL" (a URL matching the word(s) or phrase(s)), "Previous URLs" (a previous URL matching the word(s) or phrase(s)), "Nav Suggest" (a URL for searching the word(s) or phrase(s) using a default search provider), "Search Suggest" (suggested search terms corresponding to the word(s) or phrase(s) searched using the user's default search provider) and "History Results" (a number of entries in the user's history that match the word(s) or phrase(s)—selecting this item may take the user to the history results page for the word(s) or phrase(s)).

The search phrase suggestions may be related to the word(s) or phrase(s) with the highest confidence (e.g., score or ranking) within the list of alternative interpretations since the refocusing suggests that the word or phrase with the highest confidence is not accurate. Alternatively, search phrase suggestions may be presented for multiple alternative interpretations (e.g., words or phrases) within the list. In such instances, the number of suggestions for each alternative interpretation within the list may be based on the confidence score for each of the alternative interpretations (e.g., such that the highest alternative interpretation includes the highest number of suggestions and the number of suggestions for each alternative interpretation decreases down the list).

Figure 3:
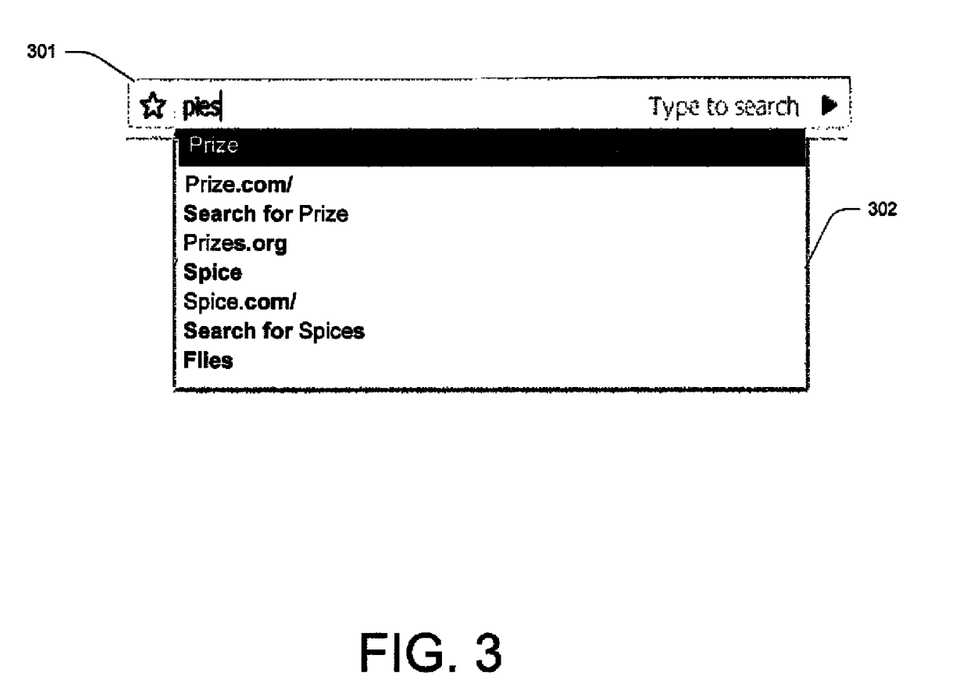
FIG. 3 illustrates a screen shot of an example user interface displayed to a user performing a voice search.

FIG. 3 illustrates a screen shot of an example user interface displayed to a user performing a voice search. As illustrated, the most likely interpretation of voice input entered by the user may be displayed within the search box 301. The system may then detect that the user has placed his/her cursor within the search box 301, as illustrated. For example, in FIG. 3, the phrase "Pies" is determined to be the most likely interpretation of a user voice input and is displayed within the search box 301. Once the system detects the user placing the cursor within the search box 301, the system determines a set of alternative interpretations and provides the alternative interpretations within the suggestion display area 302. In FIG. 3, for example, the suggestion display area 302 illustrates three alternative interpretations, "Prize", "Spice" and "Flies". The suggestion display area 302, further illustrates a set of search phrase suggestions for each of the alternative interpretations.

In this manner the alternative interpretations are presented to the user as part of the natural flow of actions likely to be taken by the user (i.e., clicking within the search box to correct the erroneous interpretation). Furthermore, by mixing in search phrase suggestions, an extra step of selecting the correct interpretation and then receiving search phrase suggestions may be avoided, thus creating a better experience for the user. Once the user has selected the intended search phrase from the alternative interpretations and search phrase suggestions, the search is conducted according to the selected search phrase.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
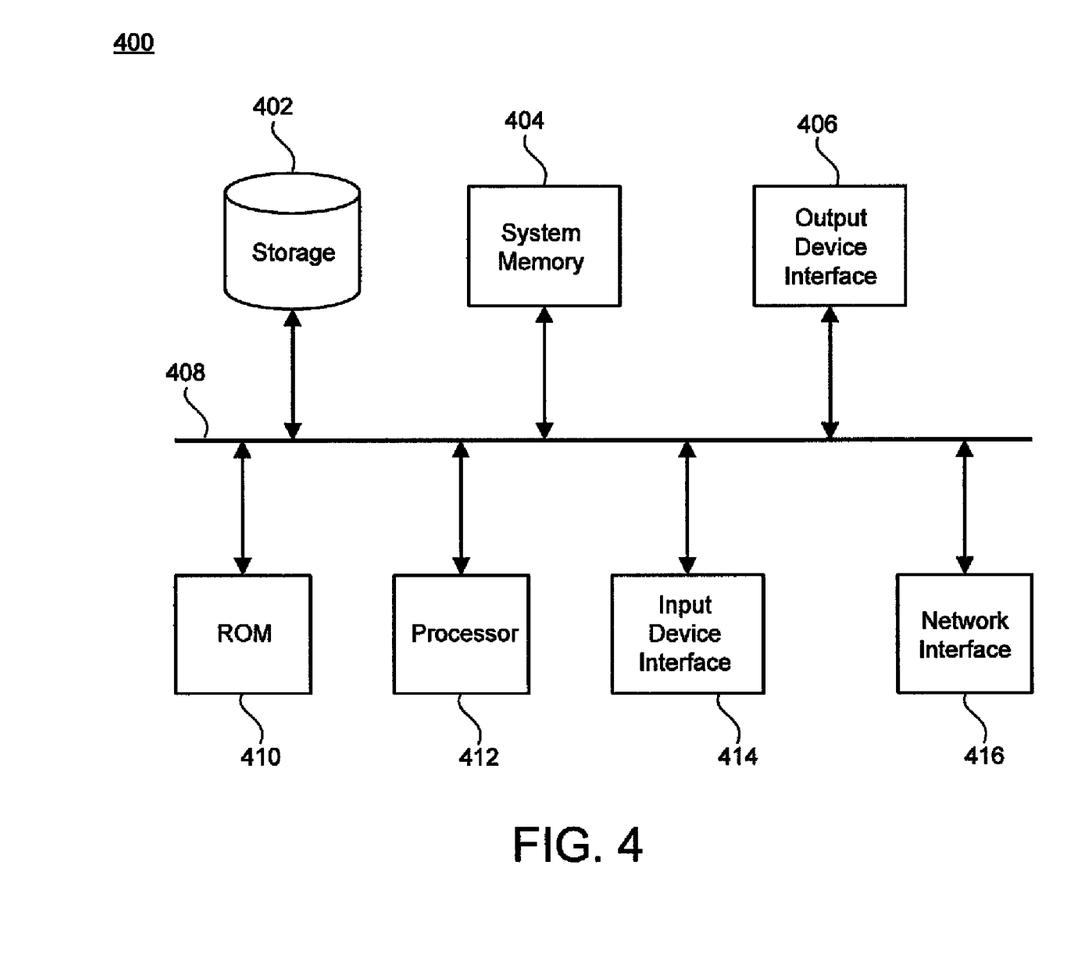
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for providing search results to a user using search by voice technology. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing alternative voice interpretations to a user, the method comprising:

receiving an indication of a request for a search from a user comprising a voice input of search criteria;

determining an n-best list of a plurality of possible interpretations of the voice input in response to receiving the indication, each possible interpretation comprising a word or phrase corresponding to the voice input;

providing a first possible interpretation of the plurality of possible interpretations for display to the user, wherein the first possible interpretation is the most likely interpretation of the voice input;

providing one or more search phrase suggestions associated with the first possible interpretation for display to the user within a suggestion display area in response to providing the first possible interpretation;

receiving an indication that the first possible interpretation does not correspond to the voice input search criteria; and providing one or more alternative interpretations of the plurality of interpretations for display to the user within the suggestion display area in response to receiving the indication that the first possible interpretation does not correspond to the search criteria;

wherein the one or more alternative interpretations are displayed within the suggestion display area instead of the one or more search phrase suggestions in response to receiving the indication that the first possible interpretation does not correspond to the search criteria.

2. The method of claim 1, wherein the first possible interpretation is displayed within a search box display area.

3. The method of claim 2, wherein the indication comprises a user clicking within the search box display area displaying the first possible interpretation.

4. The method of claim 1, further comprising:
interpreting the voice input and generating the n-best list in response to the interpreting.

5. The method of claim 1, wherein the one or more search phrase suggestions each comprise a search query corresponding to the first possible interpretation, the search query including the word or phrase corresponding to the first possible interpretation.

6. The method of claim 5, further comprising:
receiving a selection of one of the one or more search phrase suggestions; and
providing search results corresponding to the selection to the user in response to receiving the selection.

7. The method of claim 1, further comprising:
providing one or more search phrase suggestions associated with at least one of the one or more alternative interpretations for display to the user along with the one or more alternative interpretations, wherein the one or more search phrase suggestions are displayed within the suggestion display area.

8. The method of claim 7, wherein the provided one or more search phrase suggestions corresponds to one of the one or more alternative interpretations, the one of the one or more alternative interpretations having the highest likelihood of corresponding to the user voice input in relation to the other alternative interpretations.

9. The method of claim 7, wherein the provided one or more search phrase suggestions corresponds to two or more interpretations of the one or more alternative interpretations, wherein the number of search phrase suggestions corresponding to the each of the two or more interpretations is proportional to the likelihood associated with the corresponding alternative interpretation.

10. The method of claim 1, wherein each of the plurality of possible interpretations is associated a probability of corresponding to the voice input.

11. The method of claim 10, wherein the first possible interpretation is associated with the highest probability of corresponding to the voice input in relation to the other possible interpretations of the plurality of possible interpretations.

12. The method of claim 10, wherein providing one or more alternative interpretations comprises:
selecting the one or more alternative interpretations from the other possible interpretations based on the probability of corresponding to the voice input associated with each of the plurality of plurality of possible interpretations;
generating a sorted list of the selected one or more alternative interpretations based on the probability associated with each of the selected one or more alternative interpretations; and
providing the sorted list for display to the user.

13. A system for providing alternative voice interpretations to a user, the system comprising:
one or more processors; and
a machine-readable medium comprising instructions stored therein, which when executed by the processors, cause the processors to perform operations comprising:
receiving a voice input from a user corresponding to search criteria;
determining a plurality of possible interpretations of the voice input in response to receiving the indication, each possible interpretation comprising one or more words or phrases;
providing a first possible interpretation of the plurality of possible interpretations for display to the user, wherein the first possible interpretation is the most likely interpretation of the voice input;
providing one or more search phrase suggestions associated with the first possible interpretation for display to the user within a suggestion display area in response to providing the first possible interpretation;
receiving an indication that the first possible interpretation does not correspond to the voice input based on user activity; and
providing one or more alternative interpretations of the plurality of interpretations for display to the user within the suggestion display area in response to receiving the indication that the first possible interpretation does not correspond to the voice input;
wherein the one or more alternative interpretations are displayed within the suggestion display area instead of the one or more search phrase suggestions in response to receiving the indication that the first possible interpretation does not correspond to the search criteria.

14. The system of claim 13, wherein the first possible interpretation is displayed within a search box display area, and wherein the user activity comprises the user clicking within the search box display area.

15. The system of claim 13,
wherein the one or more search phrase suggestions each comprise a search query corresponding to the first possible interpretation.

16. A machine-readable medium comprising instructions stored therein, which when executed by a machine, cause the machine to perform operations comprising:
receiving an indication of a request for a search from a user comprising a voice input;
identifying a plurality of possible interpretations of the voice input in response to receiving the indication, each possible interpretation comprising a word or phrase corresponding to the voice input, wherein each possible interpretation is associated with a likelihood of corresponding to the voice input;
selecting a first possible interpretation of the plurality of possible interpretations based on the likelihood associated with each of the plurality of possible interpretations, the first possible interpretation having the highest likelihood of the plurality of possible interpretations;
providing the first possible interpretation for display to the user within a search box display area configured to receive text entries of search criteria from a user;
providing one or more search phrase suggestions associated with the first possible interpretation for display to the user within the suggestion display area in response to providing the first possible interpretation;
receiving an indication of the user clicking within the search box display area; and
providing one or more alternative interpretations of the plurality of interpretations for display to the user within a suggestion display area in response to receiving the indication of the user clicking within the search box display area;

wherein the one or more alternative interpretations are displayed within the suggestion display area instead of the one or more search phrase suggestions in response to receiving the indication of the user clicking within the search box display area.

17. The machine-readable medium of claim 16, the operations further comprising:

providing one or more other search phrase suggestions associated with at least one of the one or more alternative interpretations for display to the user along with the one or more alternative interpretations, wherein the one or more other search phrase suggestions are displayed within the suggestion display area.

\* \* \* \* \*